Sept. 7, 1937.　　　　H. T. WHEELER　　　　2,092,410
INTERCHANGEABLE MOLD
Filed March 6, 1934
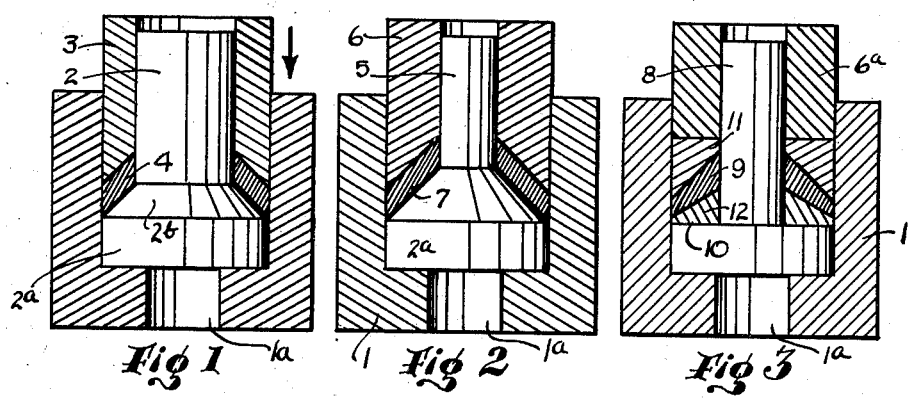
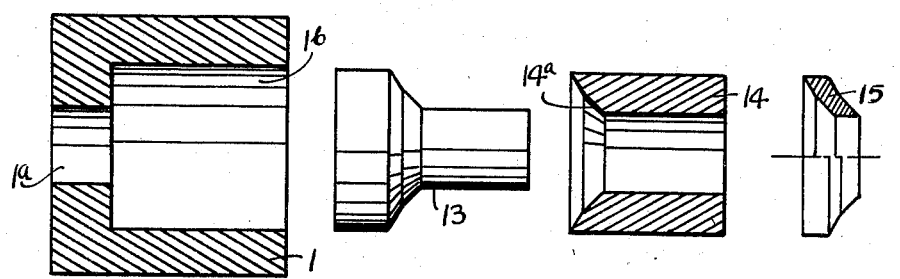
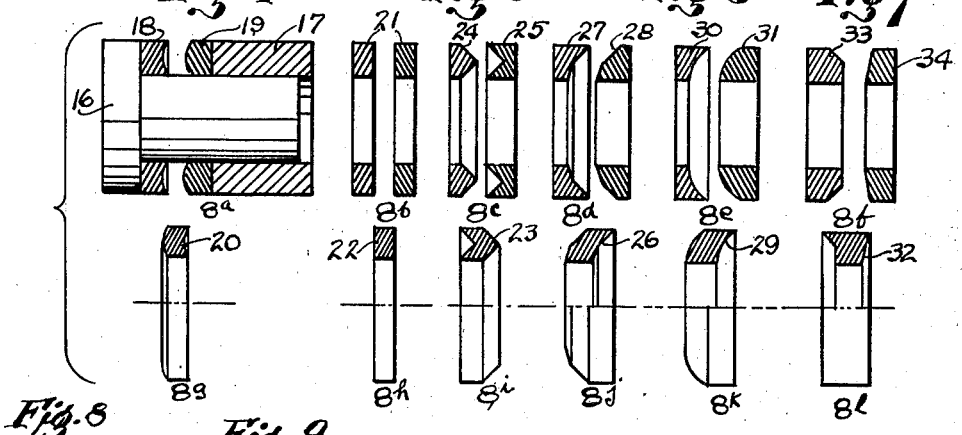
Harley T. Wheeler
INVENTOR.
Jesse R. Stone
& Lester B. Clark
BY
ATTORNEYS.

Patented Sept. 7, 1937

2,092,410

UNITED STATES PATENT OFFICE 2,092,410

INTERCHANGEABLE MOLD

Harley T. Wheeler, Dallas, Tex.

Application March 6, 1934, Serial No. 714,209

3 Claims. (Cl. 18—42)

My invention relates to an interchangeable system of molds by means of which such articles as annular rings, packing rings, piston rings, and gaskets may be manufactured.

In manufacturing packing rings of this character by means now in common use, it is necessary that a special mold be made for each size and shape of packing. Considering the inner and outer diameters of packing, piston rings and gaskets, there are many thousands of sizes now in commercial use. When it is considered that these rings or gaskets are used in all sizes of stuffing boxes to pack around many sizes of shafts or rods and that these same rings are made for use in many thousands of different installations, including pistons as well as movable rods and shafts, it will be seen that an infinitely large number of sizes and shapes of molds will be necessary. Under the present system where a separate mold for each size and shape is necessary, a large and costly equipment in molds is required. Such a system of molds will cost many thousands of dollars to produce and for this reason the number of manufacturing plants equipped to manufacture molded packing, gaskets and the like are few in number and those that are equipped to manufacture such packing are limited by the high cost of molds to a comparatively small number of sizes and shapes of molds.

It is an object of this invention to provide a system of interchangeable molds whereby an infinite number of shapes and sizes can be made with a minimum cost of equipment.

It is a further object to provide a system of molds whereby the present commercial sizes and shapes of rings are grouped and systematized for economical production.

Another object of the invention is to provide a system of molds whereby new and additional shapes and forms of packing rings may be made with little additional equipment.

It is also an object to provide a system of molds whereby wear and tear upon the parts may be easily and economically corrected or parts replaced with little expense or delay.

By my system of interchangeable molds the expense due to construction and providing new equipment for the manufacture of new types and shapes of rings may be made without great expense. It will overcome the difficulty now presented of limiting the line of goods which the manufacturer may produce and will allow the production of new and different forms without a great capital expenditure.

In the drawing herewith I have illustrated various forms of molds which may be made to carry out my invention wherein economy of production is obtained.

In the drawing, Fig. 1 is a central vertical section through a master mold and accompanying parts for a narrow width frusto-conical packing ring of comparatively large internal diameter.

Fig. 2 is a similar vertical section through a mold for constructing a different size and shape of packing.

Fig. 3 is a still further embodiment of the invention whereby a plurality of removable mold surfaces may be employed.

Fig. 4 is a longitudinal section through the master mold shown separately.

Fig. 5 is a side elevation of a stem for producing a double tapered conical ring.

Fig. 6 is a central longitudinal section through a collar to be employed with the stem shown in Fig. 5.

Fig. 7 is a side view partly in section illustrating the shape of the packing rings which may be produced by the three parts shown in Figs. 4, 5 and 6.

Fig. 8a is a central section showing a stem and the cooperating collar whereby a plurality of mold faces may be employed in the manufacture of packing, the shape of the packing produced thereby being shown in Fig. 8g.

Fig. 8b to Fig. 8f, inclusive, illustrate a plurality of different cooperating mold faces which may be employed with the stem and collar shown in Fig. 8a.

Fig. 8g to Fig. 8j, inclusive, show the type of packing ring which may be made by the molds disclosed in Fig. 8a to Fig. 8f, inclusive.

Fig. 9 is another stem similar to that shown in Fig. 5 but having a different mold surface.

Figs. 10 to 13, inclusive, are central longitudinal sections through a series of mold parts which may be employed in connection with a master mold such as is disclosed in Fig. 4 in the manufacture of packing rings.

In Figs. 1 to 4, inclusive, I have shown an outer cup-shaped mold 1, which I call the master mold in that it has a central chamber 1b into which the molding elements may be introduced in the formation of the packing. Centrally of this recess 1b is a downwardly extending opening 1a through which a tool may be inserted for the removal of the mold stem. It is to be understood that various types of rings may be formed within a master mold of this size, the outer diameter of said rings being however uniform.

It will be noted that the stem 2 is removable and replaceable by other sizes of stems but the internal diameter and the shape of the ring may be varied to accommodate an almost infinite number of shapes and internal diameters. The construction of a series of molds based on a constant inner diameter has proven to be more expensive than individual molds. Grouping the sizes by an outside diameter, however, allows about fifty percent of all sizes to be made with a few master molds.

In combination with a master mold of the type indicated in Fig. 4, I employ a stem or post 2, which has a base member 2a seated upon the bottom of the recess 1b and extending upwardly therein. It forms a close fit with the interior of the recess and acts to close the lower end of the recess. The post or stem 2 is reduced in diameter about the base 2a and may have a sloping or inclined surface 2b thereon upon which the packing ring may be supported. Above the sloping surface 2b the post 2 is of uniform cylindrical diameter of the size desired and it will be noted from Figs. 1 to 3, inclusive, that the size of this stem may be easily varied by the use of insertable stems which may be easily interchangeable.

When the stem 2 is in position within the master mold there is between the cylindrical portion of the stem and the inner wall of the mold an annular space to accommodate the packing member which is to be molded. To compress the packing member within this space I employ a separate collar 3. This collar is a tubular member whose outer and inner surfaces are adapted to fit closely against the mold and the stem. The inner end of the collar is shown as having the same slope or inclination as is the inclined surface 2b of the stem, thus adapting the form shown in Fig. 1 to compress the packing ring into a form having parallel upper and lower sides.

In Fig. 2 I have shown the mold 1 as having therein a post or stem 5 of smaller diameter than the post 2 and having a sloping base 7 inclined at a different angle from that of the Fig. 1 embodiment. The compression collar 6 is formed of a thickness to fit between the stem 5 and the inner wall of the master mold 1.

In Fig. 3 I have shown a similar installation but the central post is formed with a cylindrical base having an upper shoulder 10 formed at right angles to the post. In conjunction with such a post I employ rings 11 and 12 having adjacent faces formed at such an angle as to mold a ring 9 of the proper contour. In the present form the lower removable ring 12 has an upper surface inclined at a different angle relative to the post than is the lower surface of the upper ring 11, thus making it possible to produce a ring 9 having a generally frusto-conical shape but with sides not parallel. The upper ring 10 of this adjustable mold is made to cooperate with the lower end of the collar 6a by means of which pressure may be exerted upon the packing. From this embodiment of the invention it will easily be seen that the shape and size of the packing may be easily varied by the combination of different rings such as 11 and 12, it being obvious that the ring 11 may be varied while the ring 12 is used and, on the other hand, the ring 11 may be employed with numerous shapes of lower ring 12, thus making it possible to mold very many rings with different contours of the upper and lower surfaces thereof.

In Figs. 4 to 7, inclusive, I have shown the parts of an assembly whereby a packing ring with a double taper thereon may be formed. In doing this, the post or stem shown in Fig. 5 is inserted within the master mold 1 and packing introduced between the post and the mold and the collar 14 with its mold surface 14a thereon formed to cooperate with the mold surface 13 on the stem and, by exerting high pressure upon the sleeve 14, a packing ring such as is shown at 15 may be produced.

In Fig. 8 I have shown an embodiment of the invention similar to that shown in Fig. 3 with various types of removable mold surfaces which may be employed in the production of various forms of packing rings. In Fig. 8a, for example, the stem 16 has a supporting surface upon which the mold ring 18 may be placed. With this particular shape of mold the mold surface is recessed so as to provide a concave surface upon the packing ring to be formed. Cooperating with this ring 18, the ring 19 is also formed with a cooperating mold surface of convex shape engaging against the surface of the ring. A collar 17 engages upon the ring 19 whereby pressure may be exerted in the molding operation. In the showing in Fig. 8, I have arranged the packing ring to be formed by the mold surfaces immediately below the molds. Thus the packing ring 20, formed by the molds 18 and 19, is shown in Fig. 8g immediately below the same. Figs. 8b to 8f, inclusive, show pairs of mold rings which may be used together in producing the packing members 8f to 8j, inclusive. The manner in which this is done will be obvious without detailed description. The rings 21 will shape the ring as shown at 22; the rings 24 and 25 produce the rings 23; rings 27 and 28 are used to form the packing 26; each set of mold rings acting to produce a packing ring of a shape different from the others.

Further combinations of posts and mold members may be seen in Figs. 9 to 13, inclusive. The solid stem 35 in Fig. 10, for example, is made with a thirty percent mold surface when used in combination with the solid collar 36 having a forty-five degree conical face as shown in Fig. 11. These members will produce a converging ring 37 with faces inclined at thirty and forty-five degree angles relative to the stem. Thus, I produce results similar to those obtained by Fig. 3, but with the use of skeleton mold rings 37 and 38 seen in Figs. 12 and 13, respectively. The skeleton mold 21 may be used with the stem 35 and in so doing the ring formed between the mold surface of the post 35 and the adjacent surface of the ring 21 will have an inner inclined or concaved surface and a radial plane surface on the opposite side.

It is intended to illustrate by these views that in the use of solid stems and collars in conjunction with skeleton molds thereon a multitude of interchangeable mold surfaces which can be arranged to produce the required inside and outer surfaces upon the rings, and furthermore by varying the diameter of the stem such rings may be adapted for use with various sizes of rods or shafts. It will be obvious that the number of rings which may be produced with this form of interchangeable mold is almost unlimited.

In the use of molds of this character it will be seen that very few master molds, such as is shown in Fig. 4, will be necessary and with such master molds a large number of stems or posts may be employed to vary the shape of the packing and the internal diameter thereof.

As these parts which are used with the main mold are separate and easily machined the cost is comparatively small and a large number of sizes and shapes may be provided for use without expensive outlay for materials. Also, where the mold collar 6 is made separate and removable in this manner it may be constructed and machined without the use of expensive equipment. Furthermore, in employing sleeves such as are shown at 6a in Fig. 3 with removable mold rings 11 and 12, it is possible to form and correctly machine these rings at a comparatively trifling expense and I am thus enabled to provide for the production of an infinite number of shapes and forms of rings at a very economical outlay of capital. It has been found possible therefore at a very economical and moderate outlay for molds to produce packing rings at a small fraction of the cost with the usual types of mold. The advantages of this construction will be obvious to those skilled in the art.

What I claim as new is:

1. A system of sectional molds for forming ring shaped packing including a master mold having an interior cylindrical recess, a separate stem of cylindrical shape smaller in diameter than the said recess, a base on said stem shaped to fit closely in said recess and to be supported in the lower end of said recess, an upper shoulder on said base, the upper face of said shoulder forming a mold surface, a pair of mating mold rings formed to fit closely within said recess and about said stem, and adapted to be supported by said shoulder, and a pressure collar of tubular form shaped to fit between said post and the inner walls of said recess and adapted to be forced downwardly to compress packing therein.

2. A system of sectional molds for forming ring shaped packing including a master mold having an interior cylindrical recess, a separate stem of cylindrical shape smaller in diameter than the said recess, a base on said stem shaped to fit closely in said recess and to be supported in the lower end of said recess, an upper shoulder on said base, a pair of mating mold rings formed to fit closely within said recess and about said stem and supported by said shoulder, said rings being formed with adjacent faces shaped to mold the packing between them of the desired shape, and a pressure collar of tubular form shaped to fit between said post and the inner walls of said recess and adapted to be moved freely downwardly to compress packing therein.

3. A sectional mold for producing packing rings of varying diameters including a master mold with an interior cylindrical recess having one end open and a supporting wall at the other end, a stem formed with a base to fit closely within said recess, the stem above the base being of the diameter desired for the interior diameter of the packing rings to be formed, said stem being removable, there being an opening in said supporting wall, and a pressure collar shaped to fit between said stem and said master mold, mold faces being formed for engagement with packing between said base and said collar, said collar being adapted to be forced into said mold to compress packing therein.

HARLEY T. WHEELER.